(12) United States Patent
Cousineau

(10) Patent No.: US 6,400,706 B1
(45) Date of Patent: Jun. 4, 2002

(54) SYSTEM AND METHOD FOR RE-SYNCHRONIZING A PHASE-INDEPENDENT FIRST-IN FIRST-OUT MEMORY

(75) Inventor: Kevin S. Cousineau, Ramona, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/285,287

(22) Filed: Apr. 2, 1999

(51) Int. Cl.⁷ .................................................. H04J 3/06
(52) U.S. Cl. ...................... 370/350; 370/503; 375/354
(58) Field of Search ............................... 370/350, 335, 370/320, 342, 503, 349, 507, 324, 515, 512, 509, 510, 514, 513; 375/354, 355, 356, 365

(56) References Cited

U.S. PATENT DOCUMENTS

| | | | |
|---|---|---|---|
| 4,215,348 A | | 7/1980 | Cordaro et al. |
| 4,748,622 A | | 5/1988 | Muratani et al. |
| 4,764,942 A | | 8/1988 | Shigaki et al. |
| 5,655,113 A | * | 8/1997 | Leung et al. ................ 713/401 |
| 5,742,623 A | * | 4/1998 | Nuber et al. ................. 714/798 |
| 5,828,476 A | * | 10/1998 | Bonebright et al. ......... 359/152 |
| 6,044,074 A | * | 3/2000 | Zehavi et al. ................ 370/350 |
| 6,067,272 A | * | 5/2000 | Foss et al. ................... 365/233 |
| 6,067,334 A | * | 5/2000 | Bostica et al. ............... 375/373 |
| 6,088,795 A | * | 7/2000 | Vorbach et al. ............. 713/100 |

* cited by examiner

*Primary Examiner*—Dang Ton
*Assistant Examiner*—Brian Nguyen
(74) *Attorney, Agent, or Firm*—Philip R. Wadsworth; Gregory D. Ogfod

(57) ABSTRACT

A re-synchronizing phase-independent first-in first-out (FIFO) memory aligns digital data transmitted between receive shelves and digital shelves in the gateway transceiver subsystem (GTS) of a low orbit (LEO) satellite system. RF data transmitted from an LEO satellite is segmented into multiple receive shelves designed to filter and sample a large volume of information. The receive shelves filter the data, down convert the data to an IF frequency range and clock the data into the digital shelves, where demodulator ASICs demodulate the data to retrieve an original signal sent by a mobile radio-telephone user. The resynchronizing phase-independent FIFO memory uses separate input clock (CLK_IN) signals and input synchronization (EVEN_SEC) signals to align data leaving the receive shelves. It also uses an independent timed output clock (CLK_OUT) signal and an independent output synchronization (SYNC_OUT) signal to align the same data as it goes into the digital shelves. This prevents the isochronous (same frequency) signals from being phase misaligned due to disadvantageous Doppler effects or component characteristics.

29 Claims, 11 Drawing Sheets

SYSTEM AND METHOD FOR RE-SYNCHRONIZING A PHASE-INDEPENDENT FIRST-IN FIRST-OUT MEMORY

BACKGROUND OF THE INVENTION

I. Field of the Invention

The present invention relates generally to the field of global satellite communications, and more specifically, to re-synchronizing digitally sampled data using a memory device.

II. Description of the Related Art

In recent years, a milestone in the field of telecommunications has been the development of low earth orbit (LEO) satellites for use with wireless communications devices. With LEO satellites, a user with a wireless telecommunications device, such as a handheld or mobile radio-telephone or station, a mounted or fixed mobile radio-telephone, or a paging/messaging-type device, can access another user with little signal path delay.

In one example of a satellite communications system, forty eight LEO satellites are provided in 1414 kilometer LEO, with six of these satellites distributed in each of eight orbital planes. These planes are distributed at 52 degree orbits with respect to the equator, such that each satellite completes an orbit every 114 minutes. This permits full coverage of the earth, with at least two satellites within range of a user located between seventy degree north latitude and seventy degree south latitude at any given time.

In a typical scenario, the user's analog voice data is digitized, compressed, and modulated by the mobile radio-telephone for transmission to the LEO satellite. This modulation, where the signal is multiplied by a carrier wave for external transmission, can take many different forms. In a code division multiple access (CDMA) spread spectrum modulation technique, a sinusoidal carrier wave is quadraphase (four phase) modulated by a pair of pseudonoise (PN) sequences. These PN sequences provide the spreading code that is transmitted by a single cell sector, identifying the cell location. In an exemplary system, One PN sequence bi-phase shift key (BPSK) modulates the in-phase (I) channel of the carrier, while another PN sequence bi-phase shift key modulates the quadrature (Q) channel of the carrier. The latter bi-phase shift key is referenced as the QPSK.

Additionally, in the CDMA technique, the signal is covered or channelized with an orthogonal code generally generated by using Walsh functions. This orthogonal code is referred to as a Walsh sequence, and serves to identify the particular mobile radio-telephone for the call duration. The Walsh sequences, which represent different user code channels, are preferably orthogonal to one another in order to reduce mutual interferences, and permit better link performances and higher capacities. An identical Walsh sequence is generally applied to the I and Q channels, resulting in bi-phase modulation for the orthogonal codes. Because neighboring cells and sectors have different PN spreading codes, neighboring cells and sectors can reuse Walsh sequences (channel codes). The resulting signal is an intermediate frequency (IF) data stream.

For transmission to the LEO satellites, the IF signal must be converted to the higher radio frequencies (RFs). This is implemented by one or more additional modulations, where the signal is multiplied by higher frequency carrier waves. Here, the signal is said to be "up converted" and the CDMA modulated signal is said to be "put on top of" a higher frequency carrier. Typical frequencies used by LEO satellites include the L band RF, ranging between 1.61 GHz and 1.625 GHz, the S band RF frequency, ranging between 2.485 GHz and 2.5 GHz, and the C band RF frequency, ranging between 3 GHz and 7 GHz.

In a preferred communication system the LEO satellite functions as a "bent-pipe" receiver. It receives the signal transmitted by the mobile radio-telephone, converts the frequency of the signal, and retransmits the frequency-converted signal to a gateway base station. The gateway functions as an intermediary between one party using a mobile radio-telephone and a second party using another device, which may be another wireless device such as a mobile radio-telephone, or a wired telephone. The gateway can provide communication with both Public Switched Telephone Network (PSTN) telephones and non-PSTN telephones. The LEO satellite operates to transfer signals in both call directions, i.e., to frequency-convert signals arriving from the gateway (from a PSTN or non-PSTN terrestrial telephone) and transmitted to the mobile radio-telephone, and vice versa.

Once the gateway receives the modulated signal, it must reverse the processing performed by the mobile radio-telephone to recapture the original information signal usually analog voice data. These functions are performed by a receiving antenna connected to a transceiver or receiver signal processing system referred to as a receive rack and demodulators using signal processing circuits which may be in the form of application specific integrated circuits (ASICs). These components are part of the gateway transceiver subsystem (GTS) of the gateway.

The receiving antenna system or analog receiver "down converts" the received RF signal (which is typically in the L, S or C bands) and transmits the signal to the receive rack. The receive rack further down converts the signal to an IF signal, an A/D converter_converts the signal by performing sampling, and transmits the signal to the demodulator ASICs. The demodulator ASICS mix the IF signal with outputs from I channel, Q channel and Walsh code PN generators, in order to retrieve the original analog voice signal.

Unfortunately, there are limitations created by the structure of the gateway. In a typical cellular base station system, which permits direct (i.e., without satellites) communication between mobile radio-telephones and base stations, each base station transceiver subsystem (BTS) typically supports only three sectors. However, in the LEO satellite system, many beams and associated subbeams, on the order of 16 beams per satellite, are supported by a single GTS, where a "beam" is the equivalent of one sector.

The exorbitant volume of information requires that the RF signal received from a LEO satellite be segmented in the receive rack for separate processing. These segmented portions are typically called receive shelves. The outputs from a number of receive shelves must be synchronized before being transmitted to the demodulators using demodulator ASICs for modulation. Synchronization of the outputs is problematic, because there may be delays introduced by accessory components (such as conductors or cables) that are used to convey the fragmented signals to the demodulator ASICs. When data of the same frequency (i.e., isochronous data) is phase-misaligned in this manner, it is commonly referred to as "skewed."

Another source of phase misalignment is the Doppler effect. Information transmitted from a satellite as it approaches a gateway is received at such a bit rate as if it was transmitted at a higher bit-rate because the speed of the satellite and the information transmitted from the satellite are additive. Similarly, information transmitted from a satellite as it moves away from a gateway is received at a lower bit-rate because the speed of the satellite ebbs the rate of transmission. This higher or lower speed of transmission means that the signal received by the gateway is at a higher or lower frequency than expected. This phenomenon is not as readily seen in other forms of communication, whether satellite or terrestrial, because LEO satellites travel at very high velocities relative to the receiving units (either the gateway or the mobile radio-telephone). Accordingly, there is a need to synchronize the received satellite RF signal, regardless of the increased or decreased number of bits resulting from the Doppler effect. There is also a need to ensure that the demodulation process continues reasonably error free, in the event that a synchronization failure occurs, to ensure that a good voice data signal is received by the mobile wireless device.

SUMMARY OF THE INVENTION

The present invention is directed to a re-synchronizing phase-independent first-in first-out" (FIFO) memory. The re-synchronizing phase-independent FIFO memory aligns digital data transmitted between various signal processing elements such as found in the receive shelves and the digital shelves in a gateway transceiver subsystem (GTS) of a low orbit (LEO) satellite communication system.

RF data transmitted from a LEO satellite is transmitted to an antenna, which is connected to circuit elements that down converts the data and transmits the data to the receive distribution shelf of a receive rack. The receive distribution shelf copies the data, and passes each data stream to a number of receive shelves. The receive shelves filter the data to capture a section of the RF spectrum, down convert the data to an IF frequency range and clock the data into the digital shelves. In the digital shelves, demodulator ASICs demodulate the data to retrieve an original signal sent by a mobile radio-telephone user.

To prevent misalignment of the data streams between the receive shelves and the digital shelves, the re-synchronizing phase-independent FIFO memory uses separate and independent input and output signals. Specifically, an input clock (CLK_IN) signal and an input synchronization (EVEN_SEC) signal are used to align data leaving each portion of a receive shelf. An independent output clock (CLK_OUT) signal and an independent output synchronization (SYNC_OUT) signal are used to align the data between the different segmented portions of each receive shelf, as this data goes into the digital shelves. In this manner, phase misalignments (due to disadvantageous Doppler effects or component characteristics) are removed.

BRIEF DESCRIPTION OF THE DRAWINGS

The present invention will be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE PREFERRED EMBODIMENTS

The present invention is described in terms of an example environment. In this example environment, a caller using a mobile radio-telephone communicates with a gateway using a low earth orbit (LEO) satellite. This gateway is an intermediary to a second caller. Description in these terms is provided for convenience only. It is not intended that the invention be limited to application in this example environment. After reading the following description, it will become apparent to a person skilled in the relevant art how to implement the invention in alternative environments. In fact, it will be clear that the present invention can be utilized in any communications system.

Figure 1:
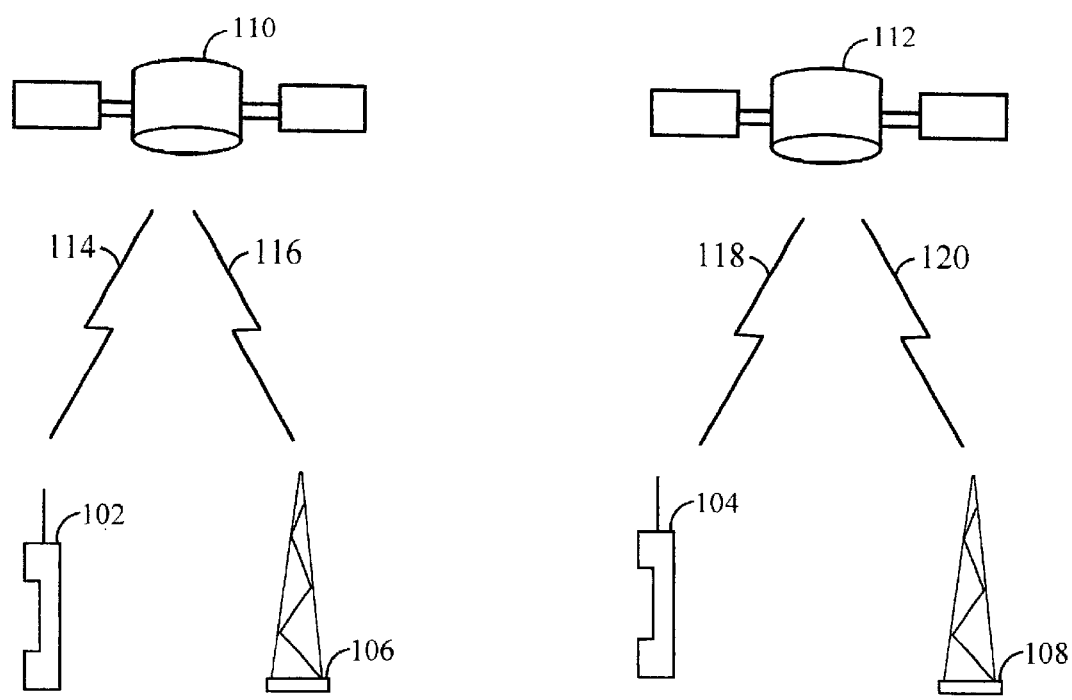
FIG. 1 illustrates a sample environment wherein the present invention functions.

FIG. 1 illustrates a sample environment wherein the present invention functions. FIG. 1 illustrates communications devices 102, 104, satellites 110, 112, and gateways 106, 108. In one embodiment, satellites 110, 112 are LEO satellites in a constellation of 48 LEO satellites in a 1414 kilometer low earth orbit. The 48 satellites are respectively distributed in 8 orbital planes, with six equally-spaced satellites in each orbital plane. This is referred to as a Walker constellation. Each satellite completes an orbit every 114 minutes, with the orbital planes inclined 52° with respect to the equator.

The Walker constellation provides two or more satellites in view of a communications device between about 70° south latitude and about 70° north latitude. This constellation coverage will permit a user, using a communications device, to communicate with another user at nearly any point on the surface of the earth within a gateway coverage area. Since gateways 106, 108 can be used to connect to the public switch telephone network (PSTN), virtually any two users can communicate via the satellites. It is also possible that gateways 106, 108 are used to connect to non-PSTN facilities and telephone equipment.

In a preferred embodiment, satellites 110, 112 effectively function as "bent pipe" repeaters. Each satellite 110, 112 receives a communications traffic signal, such as a voice signal or a data signal, from either a communications device 102, 104 or from a gateway 106, 108. Each satellite 110, 112 then converts the received communications traffic signal to another frequency band and retransmits the converted signal to the destination, where the destination is either a gateway 106, 108 or another communications device 102, 104.

Preferably, satellites 110, 112 have only the aforementioned bent pipe function, and provide no further processing, such as signal processing of received communications traffic, or providing awareness of the messages actually being transmitted. However, it should be noted that bent pipe functions of satellites 110, 112 are only exemplary of LEO satellites, and are not limiting to the present invention. In this example embodiment, there is no direct communications link between satellite 110 and satellite 112. Thus, each satellite 110, 112 functions as a bent pipe between communications devices and gateways.

Communications devices 102, 104 are representative of a wide array of devices used to provide communications with satellites 110, 112. For example, communications devices 102, 104 can be hand-held, vehicle-mounted, or fixed radiotelephones, or paging/messaging devices. In a preferred embodiment, communications devices 102, 104 have omnidirectional antennas providing bi-directional communications via one or more satellites 110, 112. To reduce interference, communications devices 102, 104 can also have directional antennas. In addition, communications devices 102, 104 can be dual-mode devices that provide circuitry for communication as terrestrial telephones or as wireless satellite telephones.

Figure 2:
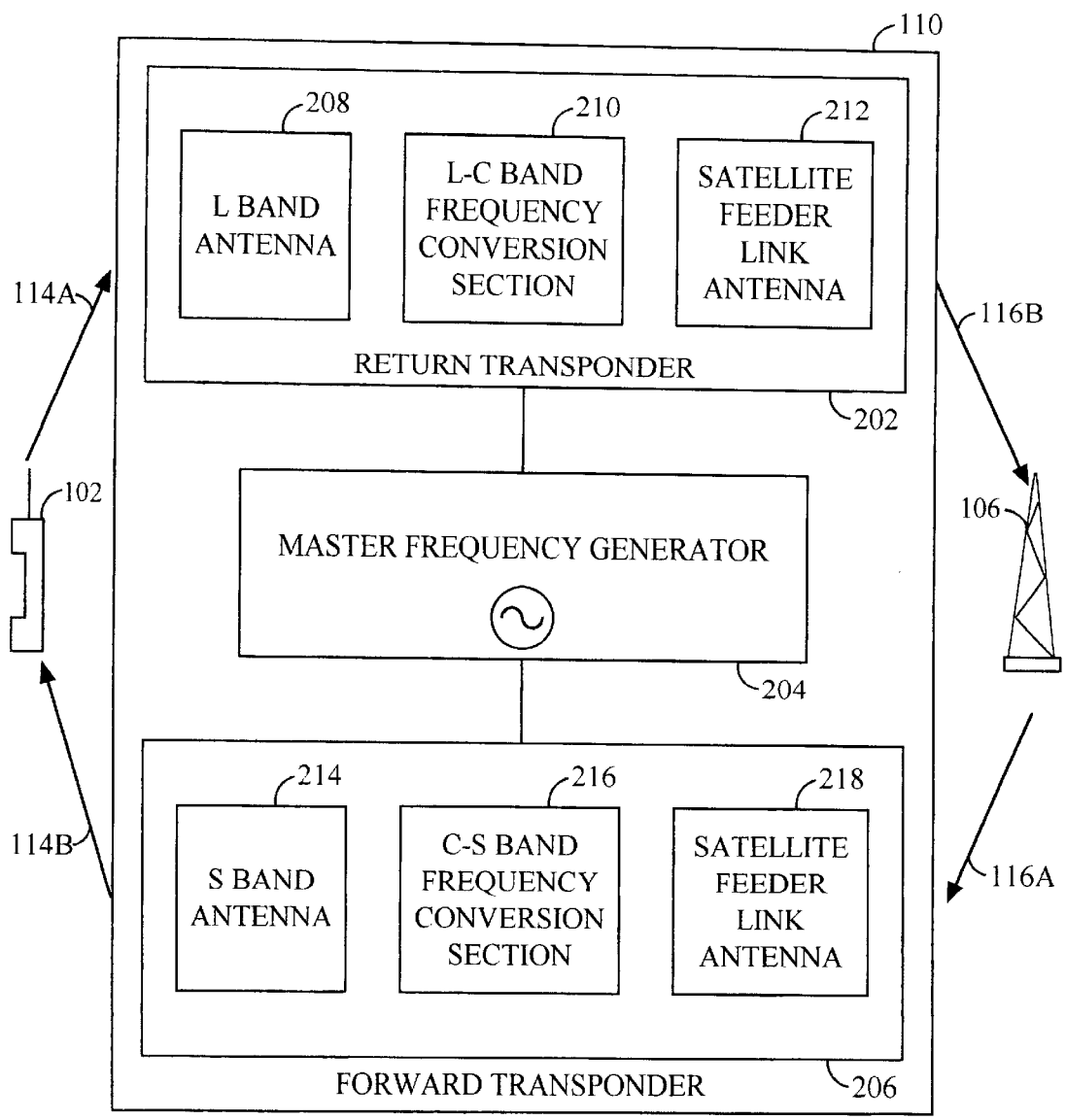
FIG. 2 illustrates the communications between communications devices and a gateway.

As illustrated in FIG. 1, there are communications links 114, 116, 118 and 120 between communications devices 102, 104 and gateways 106, 108. FIG. 2 is a block diagram illustrating the communications between communications devices 102 and gateway 106 in greater detail. Satellite 110 is seen to comprise return transponder 202, master frequency generator 204, and forward transponder 206. Return transponder 202 comprises L band antenna 208, L-C band frequency conversion section 210, and satellite feeder link antenna 212. Forward transponder 206 comprises S band antenna 214, C-S frequency conversion section 216 and satellite feeder link antenna 218.

Communications link 114 comprises a return link 114a from communications device 102 and a forward link 114b to communication device 102. Similarly, communications link 116 comprises a forward link 116a from gateway 106 and a return link 116b to gateway 106.

In a preferred embodiment, communications device 102 has the capacity to operate in full duplex mode. Communications link 114a (i.e., the uplink to satellite 110) is an L band RF link operating within a frequency range of 1.61 GHz to 1.625 GHz. Communications link 114b (i.e., the downlink from satellite 110) is an S band RF link operating in the frequency range of 2.485 GHz to 2.5 GHz. Information conveyed over communications link 114a is received at L band antenna 208, and converted to a C band signal by way of frequency conversion section 210. The converted information is transmitted to satellite feeder link antenna 212, which transmits the resulting C band signal down to gateway 106 over communications link 116b (i.e., the downlink to gateway 106).

Similarly, in a preferred embodiment, information from gateway 106 is transmitted over communications link 116a (i.e., the uplink from gateway 106) to satellite feeder link antenna 218. Satellite feeder link antenna 218 transmits the C band signal to C-S band frequency conversion section 216. C-S band frequency conversion section 216 converts the frequency of the received signal to the S band frequency range. This signal is subsequently transmitted to S band antenna 214, which transmits the signal over communications link 114b to communications device 102.

As noted, return and forward links 116a, 116b between satellite 110 and gateway 106 are preferably in the C-band RF range, which is the range between 3 GHz and 7 GHz. However, in other embodiments, more specific ranges are possible. For example, in one embodiment forward link 116a operates in the 5 GHz to 5.25 GHz frequency range, while downlink 116b operates in the 6.875 GHz to 7.075 GHz frequency range. In still other embodiments, ranges outside of the C band frequencies can be used. For example, Ku band (i.e., ranging between approximately 10 GHz and approximately 15 GHz frequencies) and Ka band (ranging in frequencies above approximately 15 GHz) are also possible.

Moreover, it is important to note that the ranges of RF frequencies used are not limiting to the invention. As those skilled in the art will recognize, any art-recognized higher frequencies will suffice for the present invention.

Figure 3:
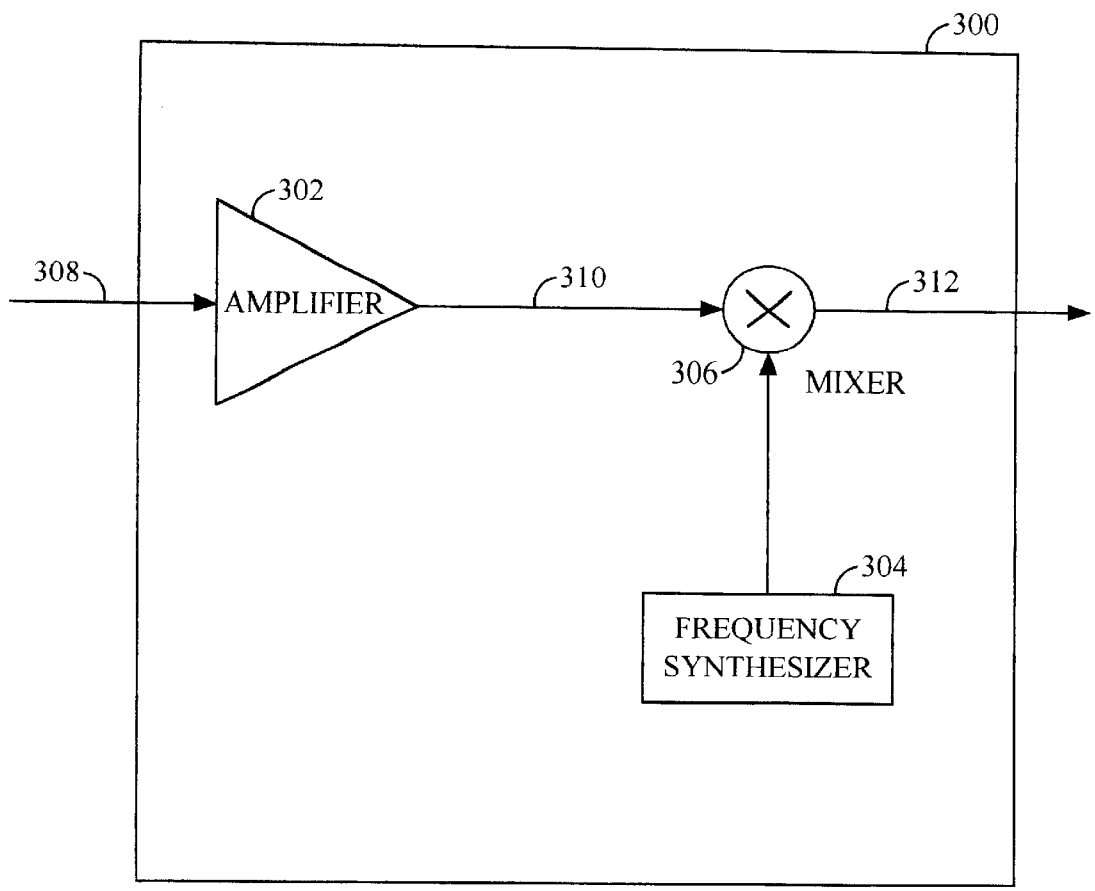
FIG. 3 is a frequency converter as referenced in the present invention.

FIG. 3 illustrates a frequency converter as referenced in the present invention. Frequency converter 300 comprises amplifier 302, frequency synthesizer 304 and mixer 306. Frequency converter 300 can be a "down converter" or an "up converter." A down converter is used to convert a signal from a higher frequency (e.g., an RF frequency) to a lower frequency (e.g., an IF frequency). An up converter is used to perform the reverse, to convert a signal from a lower frequency (e.g., an IF frequency) to a higher frequency (i.e., an RF frequency).

Taking the example where frequency converter 300 is down converting, an RF signal 308 is fed into an RF amplifier 302. RF amplifier 302 amplifies this signal to yield a strengthened signal of the same frequency 310. Frequency synthesizer 304 is designed to generate a signal at an IF frequency when multiplied by the amplified RF signal 310. The signal generated by frequency synthesizer 304 is mixed with (i.e., multiplied by) signal 310 in mixer 306. The resulting IF frequency signal 312 is output from mixer 306.

Figure 4:
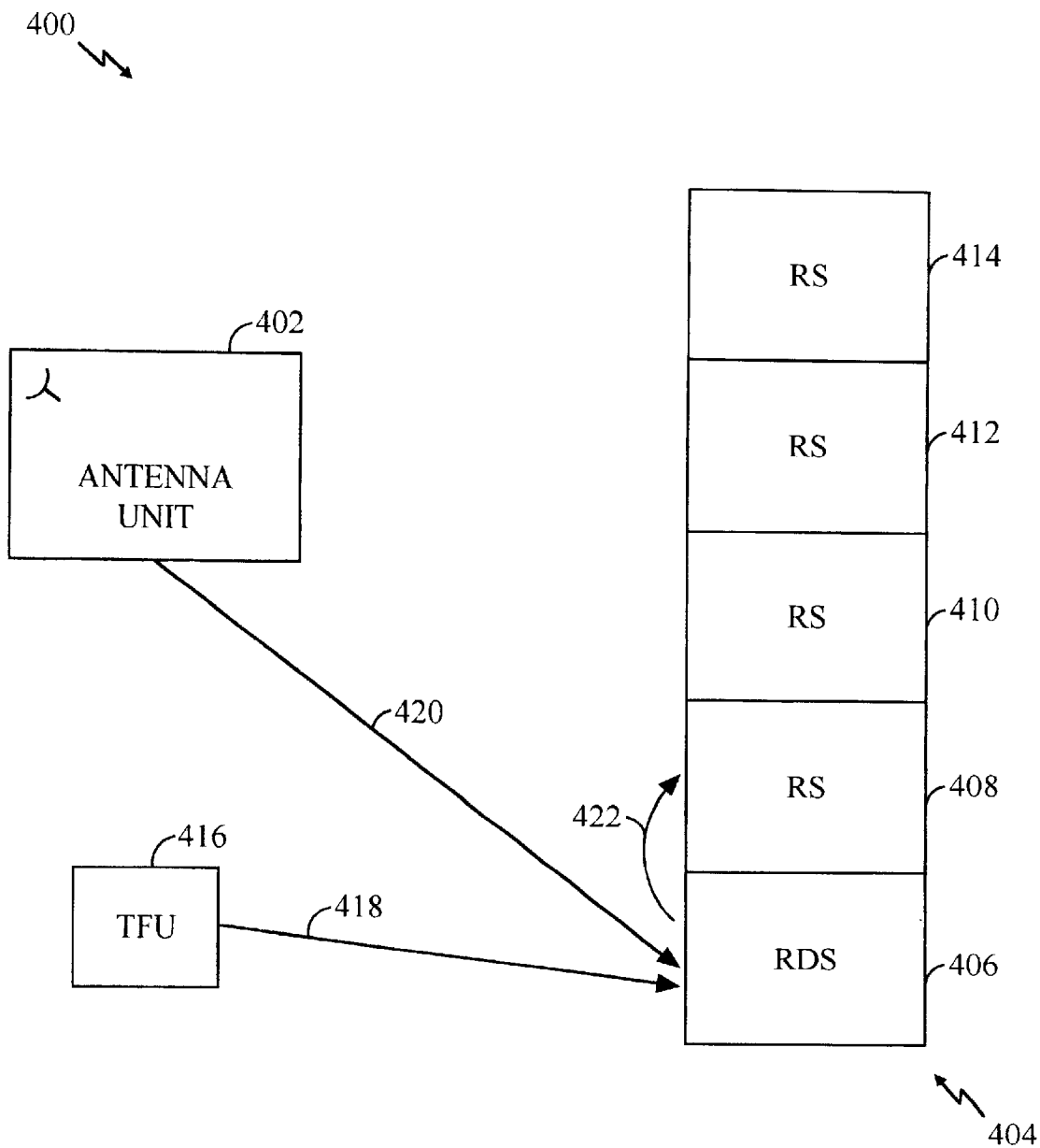
FIG. 4 illustrates an exemplary receive rack environment.

FIG. 4 illustrates an exemplary receive rack environment 400. Receive rack environment 400 includes antenna unit 402, timing frequency unit (TFU) 416 and receive rack 404. Receive rack 404 comprises receive distribution shelf (RDS) 406, and receive shelves (RSs) 408, 410, 412 and 414. TFU 416 and receive rack 404 are located in a gateway transceiver subsystem (GTS) of gateway 106.

Figure 5:
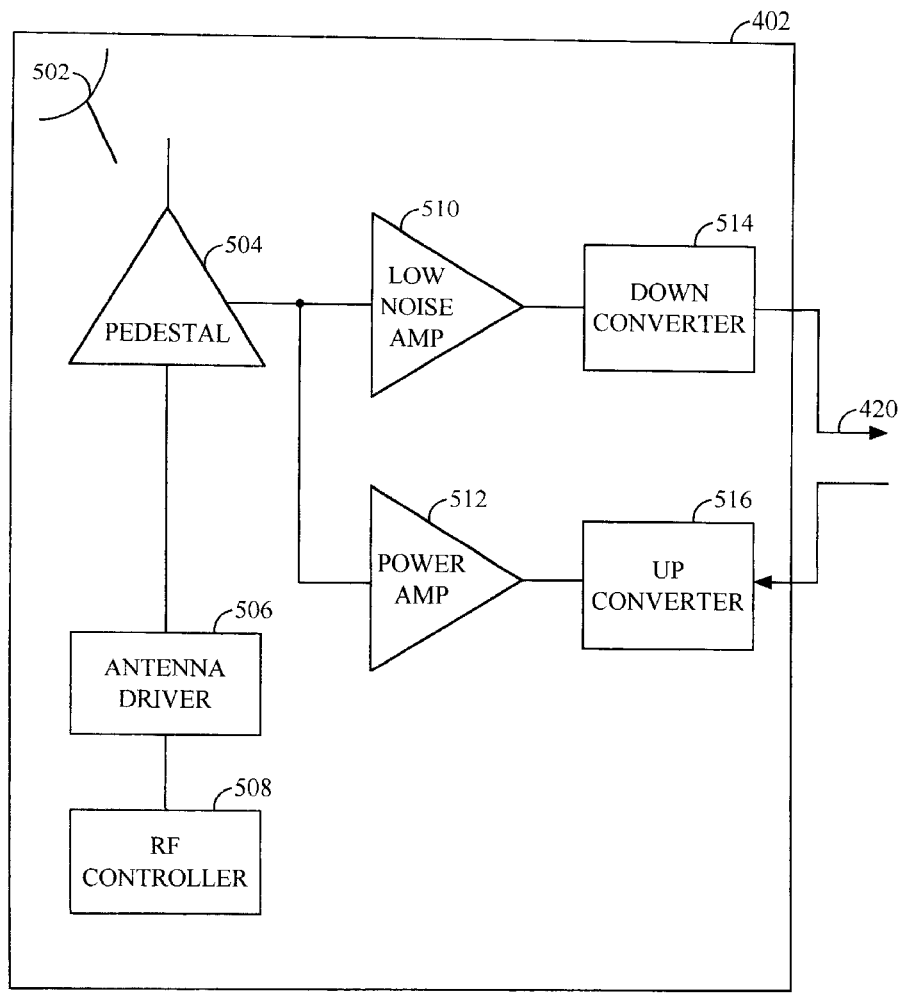
FIG. 5 illustrates an exemplary antenna unit in detail.

FIG. 5 illustrates antenna unit 402 in greater detail. Antenna unit 402 comprises dish antenna 502, pedestal 504, antenna driver 506, RF controller 508, low noise amplifier 510, power amplifier 512, down converter 514 and up converter 516. In a preferred embodiment, the subcomponents of antenna unit 402 are located inside a radome structure. The structure and interworkings of antenna unit 402 are well known.

A signal received at dish antenna 502 is subsequently down converted in frequency by one or more down converters 514. In a preferred embodiment, the signal is converted from a higher RF frequency (e.g., approximately 2 MHz) to an intermediate frequency. It is notable that the initial and final frequencies of the signal are not of consequence to the present invention. In fact, in the above-noted embodiment, a C-band RF signal is converted to an intermediate frequency signal. Because the signal received from satellite 110 is at such a high frequency, conversion back down to an IF frequency is preferably performed in stages. In antenna unit 402, the first stage of down conversion is performed. The output from antenna unit 402 is signal 420.

Down converted signal 420 is transmitted to receive rack 404. Receive rack 404 is segmented to include RDS 406 and four RSs 408, 410, 412, 414 in order to handle the large volume of traffic received from satellite 110.

Specifically, it is RDS 406 of receive rack 404 that originally receives down converted signal 420 transmitted from antenna unit 402. RDS 406 includes one or more of its own down converters, which step down the frequency of the signal received from antenna unit 402. In a preferred embodiment, RDS 406 steps down the signal to an approximately 70 MHz signal. RDS 406 makes multiple copies (here four) of the resulting signal, and passes a copy to each of RSs 406, 408, 410 and 412. The sum of output digital signals from RDS 406 to RS 408 are labeled as 422.

RDS 406 also receives input 418 from TFU 416. Over input 418, TFU 416 transmits a clock input signal (CLK__IN) and a synchronization signal, referred to as an EVEN__SEC signal. RDS 406 makes multiple copies (here four) of these signals, and transmits one copy to each of RSs 408, 410, 412 and 414. A specific implementation of this procedure is explained below. In a preferred embodiment, both the CLK__IN signal and the EVEN__SEC signal are emitted at 19.6608 MHz frequency. In this embodiment, the EVEN__SEC signal is a single pulse emitted every 2 seconds. Output signal 422, from RDS 406 to RS 408, additionally includes the CLK__IN and EVEN__SEC signals.

Figure 6:
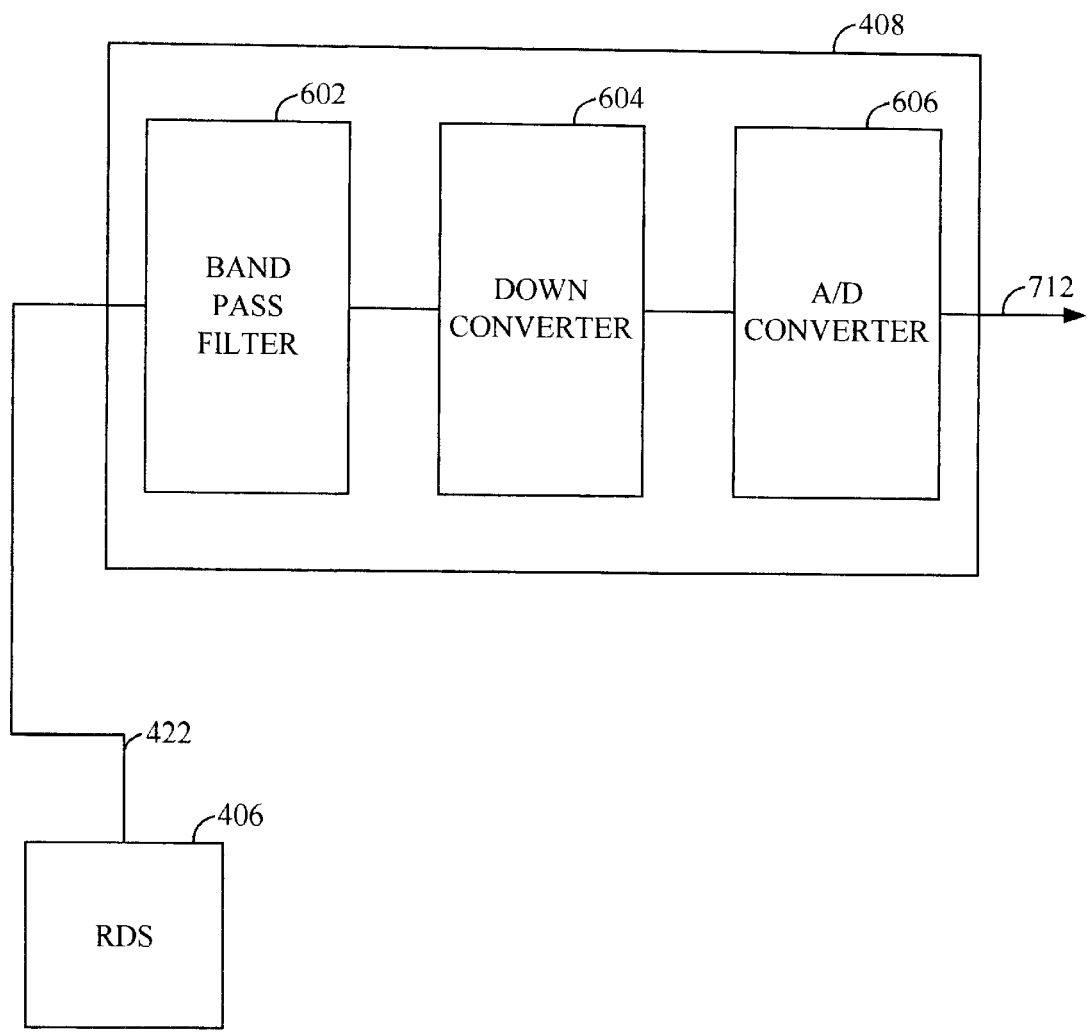
FIG. 6 illustrates an exemplary receive shelf in detail.

FIG. 6 illustrates exemplary RS 408 in greater detail. RS 408 includes band pass filter 602, down converter 604 and A/D converter 606. In a preferred embodiment, band pass filter 602 is tuned to capture a portion of the RF spectrum of signal 422 received from RDS 406. The band pass filters resident in RSs 410, 412 and 414 capture the remaining portions of the complete RF spectrum. Between RSs 408, 410, 412 and 414, the complete RF spectrum transmissions sent from 110 are captured.

Down converter 604 down converts the captured portion of the signal (i.e., the portion captured by RS 408). In a preferred embodiment, down converter 604 down converts the captured portion to a 19.6608 MHz phase shift key (PSK) IF signal. The resulting analog IF signal is sampled by A/D converter 606, to yield a digital IF signal. (Similar digital IF signals are generated by all four RS shelves 408, 410, 412 and 414.) Signal 712, which is output from RS 408, includes this digital IF signal, in addition to CLK__IN and EVEN__SEC signals output from RS 408.

Figure 7:
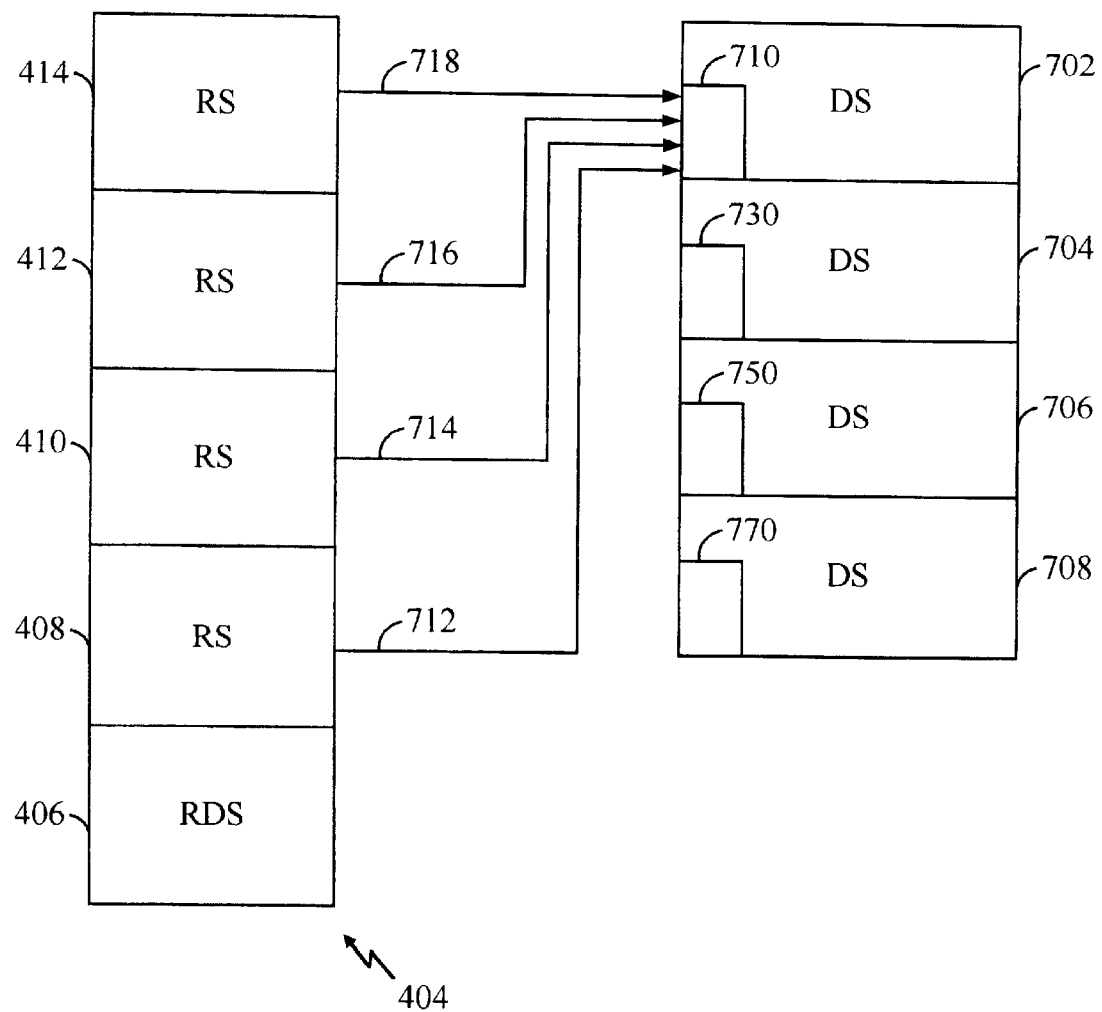
FIG. 7 illustrates exemplary digital shelves.

FIG. 7 illustrates digital shelves (DSs) 702, 704, 706 and 708. Each of DSs 702, 704, 706 and 708 receives a 16 bit digital IF signal, from the four RSs 408, 410, 412 and 414. The 16 bit digital IF signals 714, 716 and 718, which are output from RSs 410, 412 and 414, respectively, are obtained in a similar manner as signal 712. Therefore, DS 702 respectively receives as inputs signals 712, 714, 716 and 718 from RSs 408, 410, 412 and 414.

The DSs further include synchronization portions. Specifically, DSs 702, 704, 706 and 708, respectively, include synchronization portions 710, 730, 750 and 770. These synchronization portions are discussed below with reference to FIG. 9.

Figure 8:
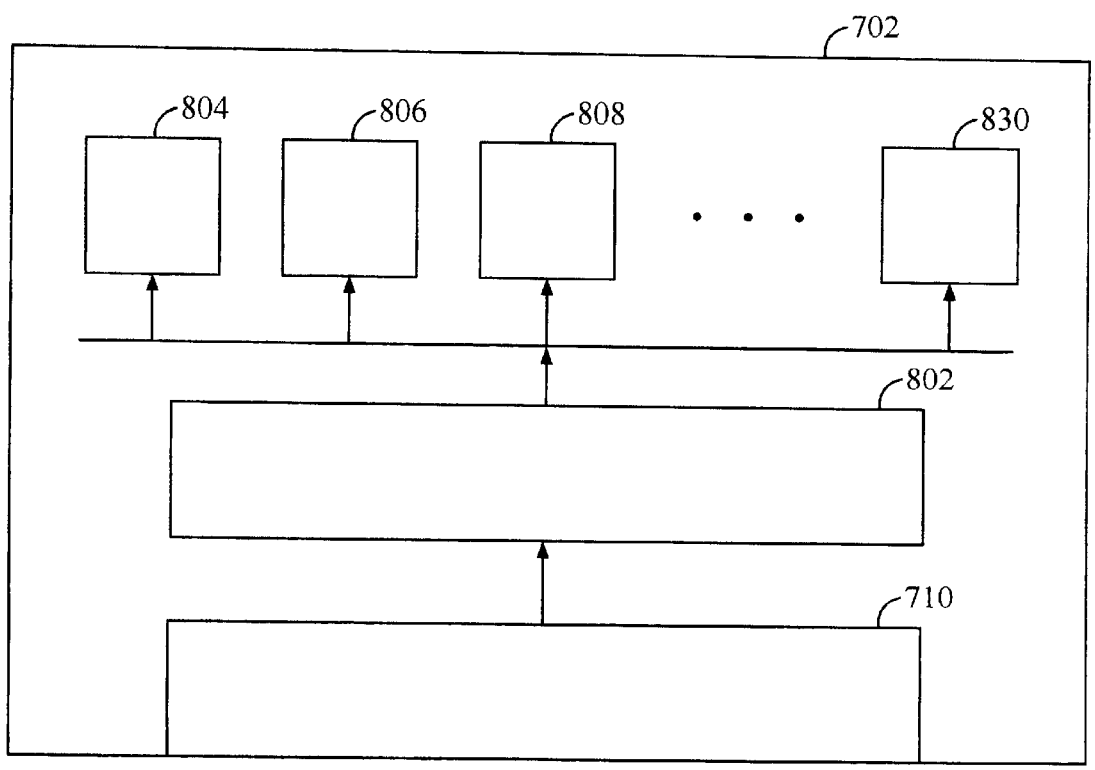
FIG. 8 illustrates an exemplary digital shelf in greater detail.

FIG. 8 illustrates an exemplary DS 702 of FIG. 7. DS 702 includes synchronization portion 710, integrated circuit (IC) card 802, and 14 demodulating cards (DMCs) 804, 806, 808, . . . , 830. IC card 802 functions to receive signals from synchronization portion 710 and distribute the signals to the DMCs. Each of DMCs 804, 806, 808, . . . , 830 includes 8 demodulator application specific integrated circuits (demodulator ASICs). From synchronization portion 710, IC 802 receives digital IF signals and buses the signals to the 14 DMCs, where the demodulator ASICs function to demodulate the digital IF signals to retrieve the original voice data signal transmitted by a mobile radio-telephone user. The operation of the demodulator ASICs is well know to those skilled in the art. In a CDMA spread spectrum communication system, this_operation includes exclusive OR'ing the output of a Walsh code PN sequence generator with the outputs of I and Q channel PN sequence generators, correlating the resulting output with the digital IF signal input from the RSs, and performing transformation and decoding operations to derive the original signal, such as for a voice signal.

Figure 9:
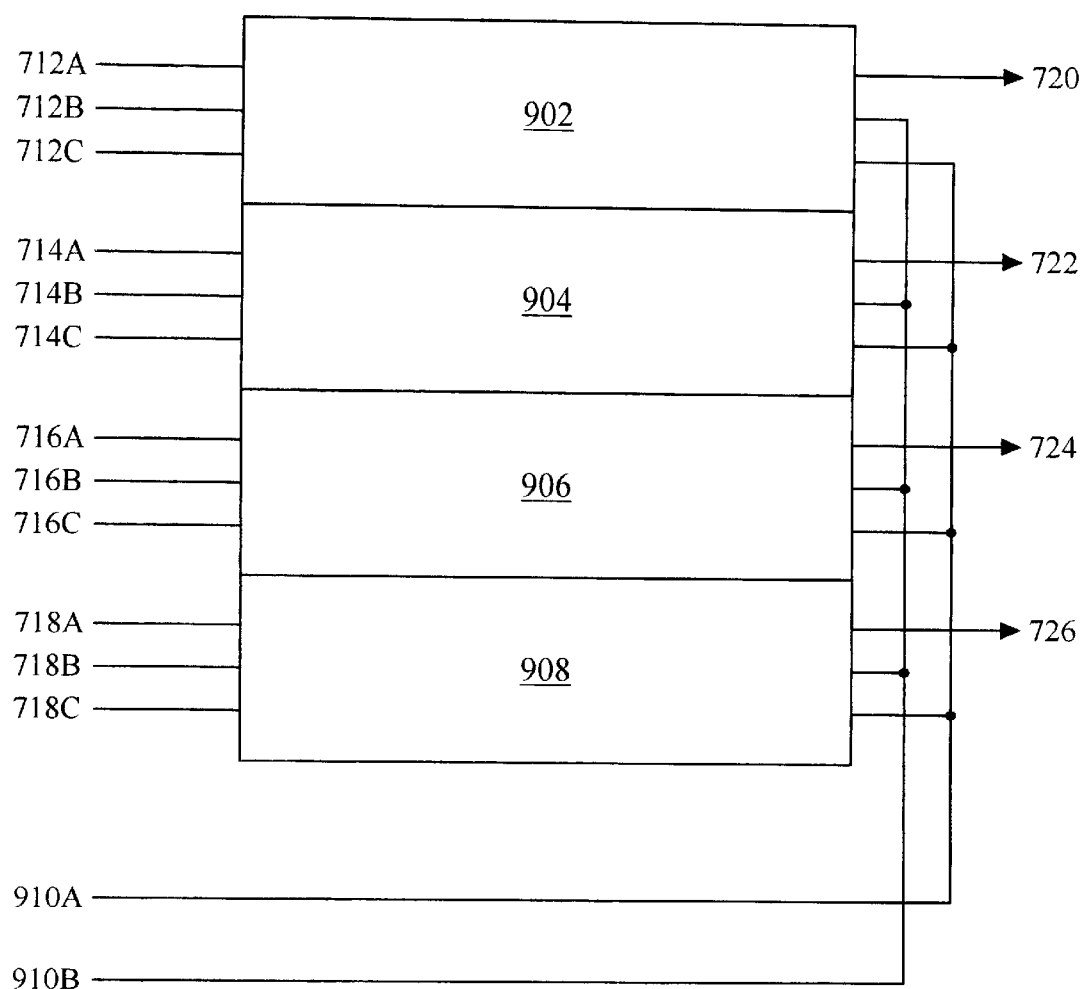
FIG. 9 illustrates the synchronization portion of a digital shelf in detail.

FIG. 9 illustrates synchronization portion 710 in detail. Synchronization portion 710 includes re-synchronizing phase-independent first-in first-out memory circuits 902, 904, 906 and 908. Signals 712, 714, 716 and 718, input from RSs 408, 410, 412 and 414, are shown in detail as signals 712a, 712b, 712c, 714a, 714b, 714c, 716a, 716b, 716c, 718a, 718b and 718c.

Circuit 902 receives as inputs signals 712a, 712b, 712c. Signal 712b is the down converted digital IF signal transmitted RS 408. Signal 712b is the CLK__IN signal transmitted from RS 408. Signal 712a is the EVEN__SEC signal transmitted from RS 408.

Similarly, circuit 904 receives as input signals 714a, 714b, 714c, circuit 906 receives as inputs signals 716a, 716b, 716c, and circuit 908 receives as input signals 718a, 718b, 718c. For each circuit, the input signals are similar to those input to circuit 902. For example, signal 718a is the EVEN__SEC signal from RS 414, signal 718b is the CLK__IN signal from RS 414 and signal 718 is the down converted digital IF signal from RS 414.

Circuits 902, 904, 906 and 908 each also receive an output synchronization signal (called the SYNC__OUT signal) 910a and an output clock signal (called the CLK__OUT signal) 910b. These signals are respectively derived from the EVEN__SEC and CLK__IN signals, as described below.

Signals 720, 722, 724 and 726 are output from circuits 902, 904, 906 and 908, respectively. These output signals are a synchronized version of the input digital IF signals 712c, 714c, 716c and 718c. Referring back to FIG. 8, these output signals are fed to the IC and DMC cards in order to demodulate the synchronized digital IF signals to retrieve the original voice data signal.

Since there are four RSs 408, 410, 412 and 414, each with four inputs into DSs 702, 704, 706 and 708, there are accordingly 16 conductors or cables extending from receive rack 404 to the DSs. As noted, each DS receives as input a digital IF signal, an input EVEN__SEC signal, a SYNC__OUT signal, a CLK__IN signal and a CLK__OUT signal.

There are several factors that can create skews, or phase misalignments, between the isochronous signals transmitted to the synchronization portions 710, 730, 750 and 770. A variety of physical factors can cause skews between the signals. These factors include the difference in the lengths of the cables, the difference in the quality of the cables, and the difference in the quality of manufactured equipment, such as signal processing elements or drivers. It must be noted that any man-made materials, such as copper fibers and electronic equipment, cannot be made identical. This fact, that there are built-in differences between "identical" equipment, will always create phase misalignments induced by delays. In a preferred embodiment, the respective CLK__IN and EVEN__SEC signals are laboratory tested to be no more than 20 ns apart in phase in a common cable (e.g., in a single cable transmitting signals 712a, 712b and 712c) and to be no more than 70 ns apart between different cables (e.g., between cables transmitting signals 712, 714, 716 and 718).

Moreover, however, the Doppler effect experienced by signals can cause phase misalignment due to the relative velocity of LEO satellites. Because the velocity of the satellite can add or subtract from the speed at which the signal is transmitted to the gateway, skews can occur between the signals received at and transmitted from different RSs. If LEO satellite 110 is approaching gateway 106 in its orbital pattern, it is more likely that extra bits are received at an RS of gateway 106 than expected over a given period of time. Similarly, if LEO satellite 110 is moving away from gateway 106, it is more likely that fewer bits are received at an RS of gateway 106 than expected.

The structure and function of synchronization portions 710, 730, 750 and 770 prevent phase misalignment and ensure that the demodulation process continues relatively error or "glitch" free (in the event that a synchronization failure occurs), in order to ensure that a good data signal is received, such as for a voice signal being received by a called party. These functions are provided by the re-synchronizing phase-independent first-in first-out memory circuits comprising each of synchronization portions 710, 730, 750 and 770.

Figure 10:
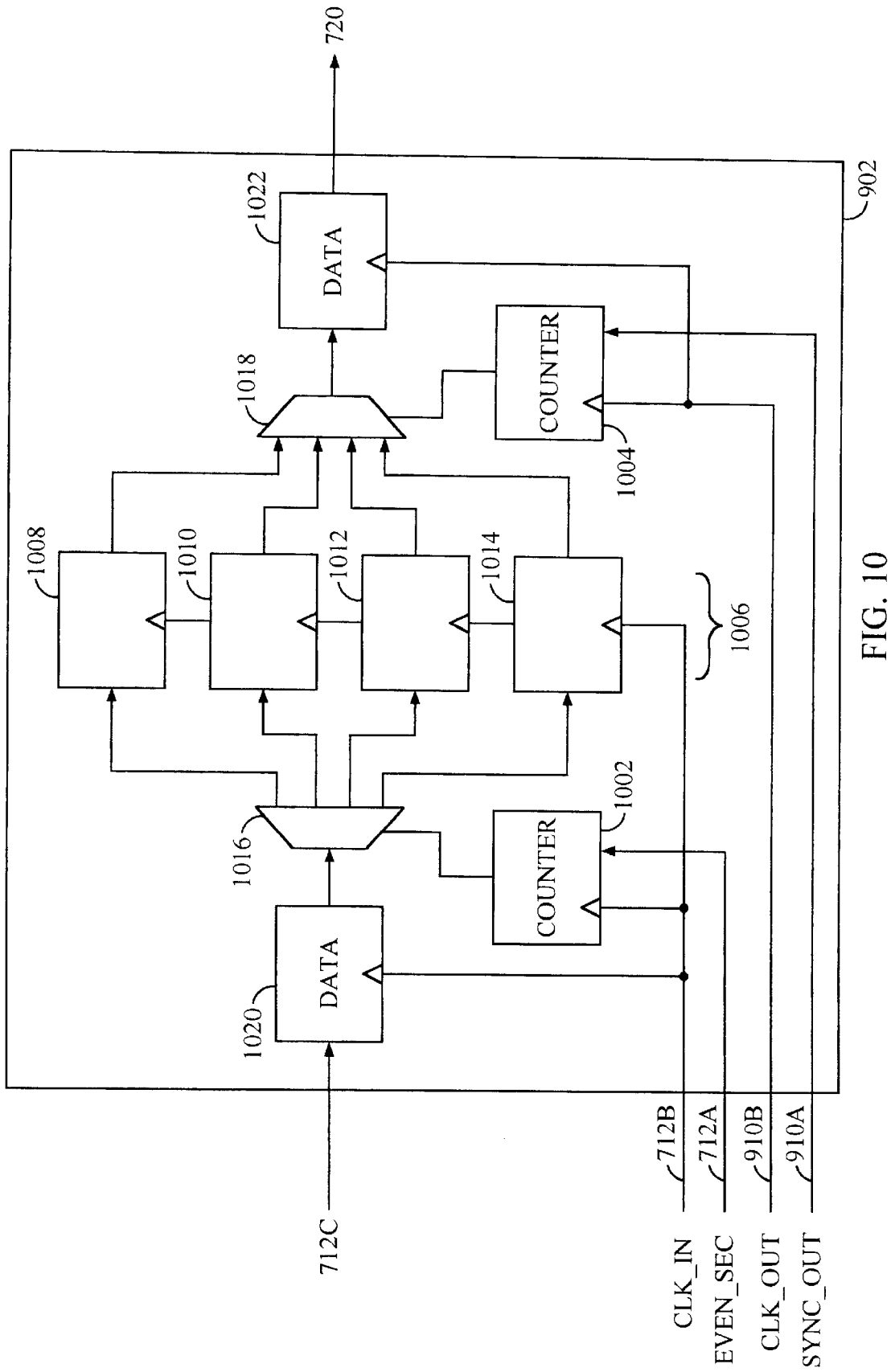
FIG. 10 illustrates a re-synchronizing phase-independent first-in first-out memory circuit.

As noted, exemplary synchronization portion 710 includes four such circuits, namely circuits 902, 904, 906 and 908. These circuits function in parallel. FIG. 10 is a block diagram illustrating circuit 902 in detail. FIG. 10 comprises read pointer 1016, write pointer 1018, counter 1002, counter 1004, data input memory location 1020, data output memory location 1022, and a four-deep ordered memory 1006. Memory 1006 is a first-in first-out (FIFO) memory, comprising memory locations 1008, 1010, 1012 and 1014. Each of these memory locations stores a single bit.

The digital IF signal 712c is provided as an input to data input 1020 one bit at a time. The data is sequentially clocked into locations 1008, 1010, 1012 and 1014. Counter 1002 receives CLK_IN signal 712b and EVEN_SEC signal 712a. When the EVEN_SEC signal is high (which is the case except for a low pulse every 2 seconds), counter 1002 toggles read pointer 1016 to the next FIFO location at each edge of CLK_IN signal 712b. Accordingly, data from data input 1020 goes from 1008- to 1010- to 1012- to 1014, and then back to 1008, over and over again.

Write pointer 1018 is independent of read pointer 1016. Write pointer 1018 must be timed to point ahead of read pointer 1016, so that data in FIFO 1006 is not overwritten before it is output. In a preferred embodiment, write pointer 1018 is two locations ahead of read pointer 1016. Counter 1004 receives CLK_OUT signal 910b and SYNC_OUT signal 910a. When the SYNC_OUT signal 910a is high (which is the case except for a low pulse every 2 seconds), counter 1004 toggles write pointer 1018 to the next FIFO location at each edge of CLK_OUT signal 910b. Accordingly, data from the FIFO location pointed to by write pointer 1018 is output to data output 1022 at each edge of CLK_OUT signal 910b.

EVEN_SEC signal 712a is a single pulse transmitted every 2 seconds, which causes read pointer 1016 to point to 1008. During normal operation, EVEN_SEC signal 712a occurs to cause read pointer 1016 to toggle back to FIFO location 1008 after the last data was read into FIFO location 1014. However, a phase misalignment may cause the last read FIFO location to be different from FIFO location 1014. In this case, during the occurrence of the EVEN_SEC pulse, no matter what FIFO location the read pointer 1016 is pointing to, it returns to FIFO location 1008 (i.e., the data input 1020 is read into FIFO location 1008).

SYNC_OUT signal 910a is similarly a pulse transmitted every 2 seconds. SYNC_OUT is selected from one of EVEN_SEC signals 712a, 714a, 716a and 718a. When the SYNC_OUT signal goes low (i.e., "pulses"), it functions to return write pointer 1018 back to FIFO location 1008. In this manner, all four circuits 902, 904, 906 and 908 write data to IC card 802 at the same time.

Figure 11:
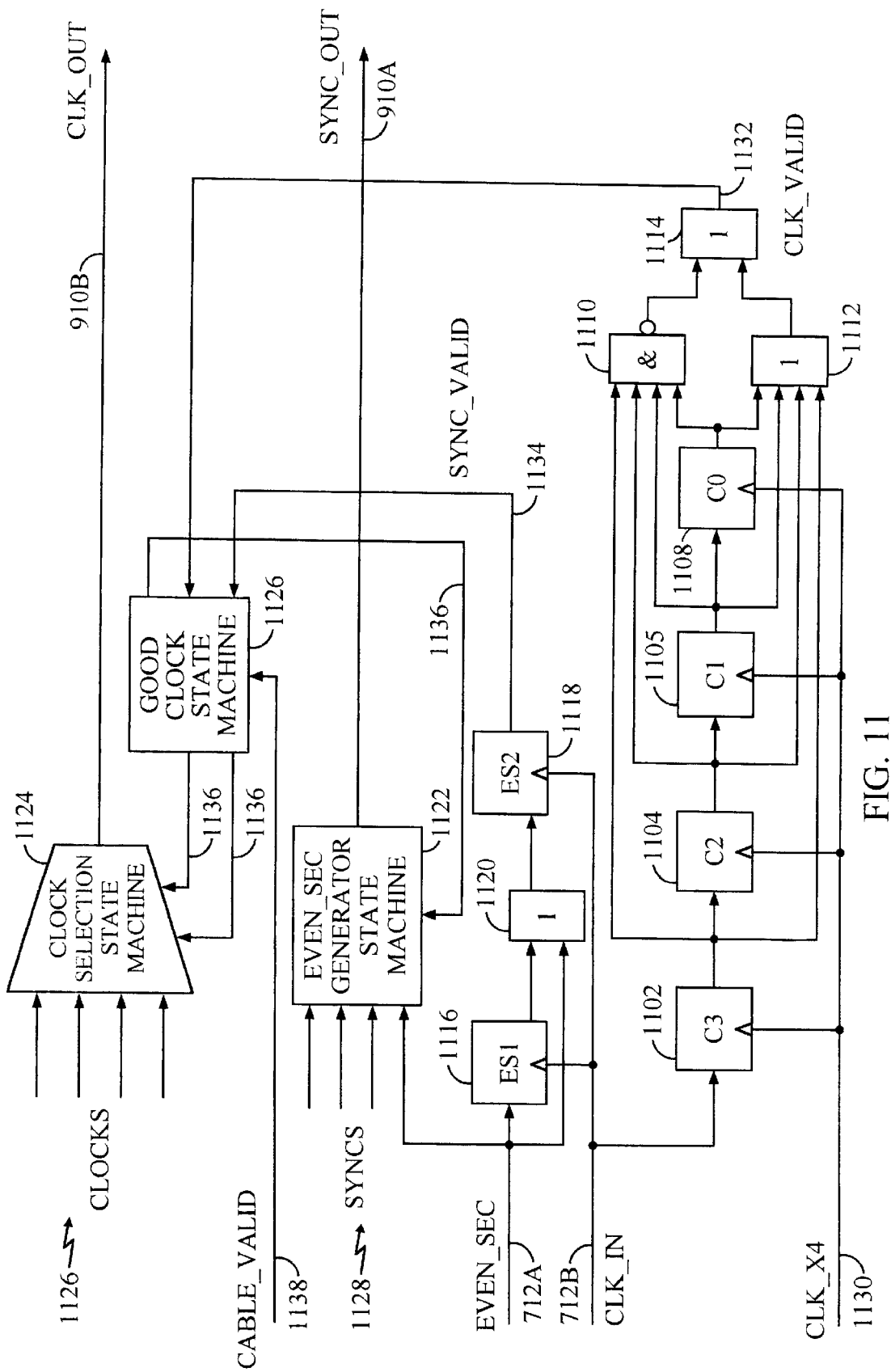
FIG. 11 illustrates an output clock signal and output synchronization signal selector module.

FIG. 11 illustrates an exemplary module 1100 used to generate a valid SYNC_OUT signal and a valid CLK_OUT signal. Specifically, module 1100 is used to generate SYNC_OUT signal 910a from EVEN_SEC signals 712a, 714a, 716a and 718a, and to generate CLK_OUT signal 910b from CLK_IN signals 712b, 714b, 716b and 718b.

A CLK_VALID signal 1132 is generated for each of the CLK_IN signals. CLK_IN signal 712b and CLK_X4 signal 1130 (which is CLK_IN signal 712b sampled at a 4x rate) are fed to sequentially-delayed registers 1102, 1104, 1106, 1108. Between registers 1102, 1104, 1106 and 1108, a snapshot of a full phase cycle is obtained. OR gate 1112 and AND gate 1110 are fed outputs from these registers, to determine whether the CLK_IN signal 712b is valid or not. In other words, if all the components of one cycle are high or are low, the clock is no longer valid. The resulting CLK_VALID signal 1132 is fed to good clock state machine 1126. This CLK_VALID detection circuit is repeated three more times, so that CLK_VALID signals are obtained for all four CLK_IN signals 712b, 714b, 716b and 718b (not shown). Accordingly, good clock state machine 1126 receives four CLK_VALID signals. This analysis is referred to as a duty cycle analysis.

A SYNC_VALID signal 1134 is generated for each of the EVEN_SEC signals. EVEN_SEC signal 712a and CLK_IN signal 712b are fed to sequentially-delayed registers 1116 and 1118. Between registers 1116, 1118, and OR gate 1120, the previous cycle and the current cycle are compared to one another. If the output of register 1118 is low, it indicates that the signal has been the same for more than one cycle, and a bad SYNC_VALID signal 1134 is fed to good clock state machine 1126. Otherwise, a good SYNC_VALID signal 1134 is transmitted. This SYNC_VALID detection circuit is repeated three more times, so that SYNC_VALID signals are obtained for all four EVEN_SEC signals 712a, 714a, 716a and 718a (not shown). Accordingly, good clock state machine 1126 receives four SYNC_VALID signals.

CABLE_VALID signal 1138 is a signal indicating whether appropriate (i.e., properly functioning) mechanical and/or electrical connections are maintained between a DS and a corresponding RS. CABLE_VALID signal 1138 is fed to good clock state machine 1126.

EVEN_SEC generator state machine 1122 is a machine tasked with finding the SYNC_OUT signal corresponding to a new CLK_IN signal, if the current CLK_IN signal is determined to be invalid. EVEN_SEC generator state machine 1122 is fed output 1136 from good clock state machine 1126, indicating whether the current CLK_IN signal is a valid signal, as well as all of the EVEN_SEC signals 1128 (i.e., 712a, 714a, 716a and 718a). If the current CLK_IN signal is not a valid signal, EVEN_SEC generator state machine 1122 selects a SYNC_OUT signal corresponding to the new CLK_IN signal. If the SYNC_OUT signal is invalid, a new SYNC_OUT signal is selected.

Good clock state machine 1126 is a machine tasked with finding a new CLK_IN signal if the current CLK_IN signal is invalid. Good clock state machine 1126 is fed CABLE_VALID signal 1138, SYNC_VALID signal 1134 and CLK_VALID signal 1132. Its output 1136 is fed to EVEN_SEC generator state machine 1122 and clock selection state machine 1124. If the current CLK_IN signal is not a valid signal, good clock state machine 1126 selects the next available CLK_IN signal, and then delays using the new clock signal until there is appropriate clock alignment (i.e., to effect a valid clock transition).

Finally, clock selection state machine 1124 is a multiplexer which receives clock signals 1126 (i.e., comprising CLK_IN signals 712b, 714b, 716b and 718b) and a select signal 1136 from good clock state machine 1126. Based on the select signal 1136, clock selection state machine 1124 chooses a CLK_OUT signal 910*b* from the CLK_IN signals.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What I claim as my invention is:

1. A method for re-synchronizing isochronous data streams, comprising the steps of:

receiving data independently from each stream;

storing the received data in a synchronous first-in first-out (FIFO) memory referenced by a synchronization pulse;

evaluating timing information received with each data stream to determine which streams contain valid data and selecting a clock from one valid data stream;

clocking data out of said FIFO as a function of the selected clock when all valid synchronization pulses have been received; and continually reevaluating one or more additional clocks from said data streams;

switching to one of said one or more additional clocks if said selected clock becomes invalid without loss of data.

2. The method for re-synchronizing digital data of claim 1, further comprising:

applying an input clock signal and an input synchronization signal to align data being stored in said FIFO; and applying an independent output clock signal and an independent output synchronization signal to align data transferred out of said FIFO.

3. The method for re-synchronizing digital data of claim 1, further comprising receiving said data streams from a wireless telephone at a gateway base station including said FIFO.

4. The method for re-synchronizing digital data of claim 1, wherein said re-synchronizing is applied in a code division multiple access communication system using a spread spectrum modulation technique, which results in a communication signal in the form of a data stream at an intermediate frequency.

5. The method for re-synchronizing digital data of claim 1, wherein said re-synchronizing is applied in low Earth orbit based communication system.

6. The method for re-synchronizing digital data of claim 1, wherein said re-synchronizing aligns digital data transmitted between various signal processing elements found in signal receive shelves and digital signal processing shelves in a gateway transceiver system of an orbiting satellite based communication system.

7. A method for re-synchronizing isochronous digital data, comprising the steps of:

receiving the digital data from each of a plurality of receive shelves in a data input memory location;

clocking-in the digital data from said memory location into one of a plurality of memory locations of a first-in first-out (FIFO) memory in a sequential manner using a clock input signal received with the digital data;

synchronizing said clocking-in of the digital data using a synchronization input signal received with the digital data;

clocking-out the digital data from said FIFO memory into a data output memory location, wherein said clocking-out is performed in a sequential manner using a clock output signal selected from said clock input signal and one or more other clock input signals;

synchronizing said clocking-out of the digital data using a synchronization output signal selected from said synchronization input signal and one or more other synchronization input signals.

8. A method according to claim 7, wherein said clock input signal and said one or more other clock input signals each correspond to a different receive shelf.

9. A method according to claim 7, wherein said synchronization input signal and said one or more other synchronization input signals each correspond to a different receive shelf.

10. A method according to claim 7, wherein said clock output signal is selected from said one or more clock input signals by any combination of:

performing a duty cycle analysis on said one or more clock input signals to determine whether the digital data is within a proper operating frequency range;

performing a valid synchronization pulse analysis on said one or more clock input signals to determine whether said synchronization input signal is valid;

performing a valid cable analysis on said one or more clock input signals to determine whether appropriate mechanical and electrical connections are maintained with said receive shelves.

11. The method for re-synchronizing digital data of claim 7, wherein there are a plurality of digital shelves for receiving the digital data from each of a plurality of receive shelves, further comprising:

applying an input clock signal and an input synchronization signal to align data leaving each portion of each receive shelf; and applying an independent output clock signal and an independent output synchronization signal to align data transferred between different segmented portions of each receive shelf, as this data goes into digital shelves.

12. The method for re-synchronizing digital data of claim 7, wherein said step of receiving the digital data from each of a plurality of receive shelves comprises:

receiving a communication signal transmitted by a wireless device at a gateway base station;

segmenting the signal for separate processing into segmented portions directed to separate signal receive shelves.

13. The method for re-synchronizing digital data of claim 7, wherein said step of receiving the digital data from each of a plurality of receive shelves comprises receiving data transmitted by a wireless telephone to a gateway base station including said receive shelves.

14. The method for re-synchronizing digital data of claim 13, further comprising receiving a communication signal in a pre-selected radio frequency range and down converting said communication signal to an intermediate frequency range.

15. The method for re-synchronizing digital data of claim 14, wherein said comprising pre-selected radio frequency range is selected from the group of L band, S band, and C band radio frequency ranges.

16. The method for re-synchronizing digital data of claim 13, further comprising up converting signals in said intermediate frequency range to a second pre-selected radio frequency range.

17. The method for re-synchronizing digital data of claim 16, wherein said comprising pre-selected radio frequency range is selected from the group of L band, S band, and C band radio frequency ranges.

18. A system for re-synchronizing isochronous digital data, comprising:
   a first-in first-out (FIFO) memory;
   a reading means for reading the digital data into said FIFO memory sequentially, said reading means comprising
      a data input memory receiving the digital data;
      a read pointer reading the digital data from said data input memory to said FIFO memory sequentially upon receiving a toggle signal;
      an input counter receiving a clock input signal and a synchronization input signal corresponding to the digital data,
         wherein said input counter clocks-in the digital data from said data input memory to said FIFO memory by transmitting said toggle signal to said read pointer upon the occurrence of a clock pulse of said clock input signal, and
         wherein said synchronization input signal resets said read pointer to read a new digital data from said data input memory to a pre-designated memory location of said FIFO memory by transmission of a pulse to said input counter; and
   a writing means for writing the digital data from said FIFO memory sequentially, wherein said writing means functions independently of said reading means.

19. A system according to claim 18, wherein said clock input signal and said synchronization input signal are emitted in an intermediate frequency range for an electronic device employing the FIFO memory.

20. A system according to claims 18, wherein said synchronization input signal comprises a pulse emitted every two seconds.

21. A system according to claim 18, wherein said writing means comprises:
   a data output memory receiving the digital data;
   a write pointer writing the digital data from said FIFO memory to said data output memory sequentially upon receiving a toggle signal;
   an output counter receiving a clock output signal and a synchronization output signal corresponding to the digital data,
      wherein said output counter clocks-out the digital data from said FIFO memory to said data output memory by transmitting said toggle signal to said write pointer upon the occurrence of a clock pulse of said clock output signal, and
      wherein said synchronization output signal resets said write pointer to write a new digital data from a pre-designated memory location of said FIFO memory to said data output memory by transmission of a pulse to said output counter.

22. A system according to claim 21, wherein said clock output signal is selected from one or more of said clock input signals by a selection module, said selection module comprising:
   means for performing a duty cycle analysis on said one or more clock input signals to determine whether the digital data is within a proper operating frequency range;
   means for performing a valid synchronization pulse analysis on said one or more clock input signals to determine whether said synchronization input signal is valid;
   means for performing a valid cable analysis on said one or more clock input signals to determine whether appropriate mechanical and electrical connections are maintained.

23. The method for re-synchronizing digital data of claim 21, comprising timing said write pointer to point ahead of said read pointer, so that data in said FIFO is not overwritten before it is output.

24. The method for re-synchronizing digital data of claim 23, comprising timing said write pointer is two locations ahead of said read pointer.

25. The system for re-synchronizing digital data of claim 21, wherein said write pointer is configured to point ahead of said read pointer, so that data in said FIFO is not overwritten before it is output.

26. The system for re-synchronizing digital data of claim 25, wherein timing said write pointer is two locations ahead of said read pointer.

27. A system for re-synchronizing isochronous digital data, comprising:
   a first-in first-out (FIFO) memory;
   a reading means for reading the digital data into said FIFO memory sequentially; and
   a writing means for writing the digital data from said FIFO memory sequentially, wherein said writing means functions independently of said reading means, comprising:
      a data output memory receiving the digital data;
      a write pointer writing the digital data from said FIFO memory to said data output memory sequentially upon receiving a toggle signal;
      an output counter receiving a clock output signal and a synchronization output signal corresponding to the digital data,
         wherein said output counter clocks-out the digital data from said FIFO memory to said data output memory by transmitting said toggle signal to said write pointer upon the occurrence of a clock pulse of said clock output signal, and
         wherein said synchronization output signal resets said write pointer to write a new digital data from a pre-designated memory location of said FIFO memory to said data output memory by transmission of a pulse to said output counter.

28. A system according to claim 27, wherein said clock output signal and said synchronization output signal are emitted in an intermediate frequency range for an electronic device employing the FIFO memory.

29. A system according to claim 27, wherein said synchronization output signal comprises a pulse emitted every two seconds.

* * * * *